United States Patent [19]
Hirano et al.

[11] 4,267,894
[45] May 19, 1981

[54] COMBINATION WEIGHING DEVICE

[75] Inventors: Takashi Hirano, Kobe; Takashi Aga, Akashi, both of Japan

[73] Assignee: Yamato Scale Company, Limited, Hyogo, Japan

[21] Appl. No.: 102,660

[22] Filed: Dec. 12, 1979

[30] Foreign Application Priority Data

Dec. 12, 1978 [JP] Japan .......................... 53-171151[U]

[51] Int. Cl.³ ............................................ G01G 19/62
[52] U.S. Cl. ........................................ 177/25; 177/50; 364/567
[58] Field of Search ................. 177/1, 25, 50, DIG. 3; 364/567

[56] References Cited

U.S. PATENT DOCUMENTS

| | | | |
|---|---|---|---|
| 3,939,928 | 2/1976 | Murakami | 177/25 |
| 4,164,260 | 8/1979 | Blodgett | 177/50 X |

Primary Examiner—Joseph W. Hartary
Attorney, Agent, or Firm—Eugene E. Geoffrey, Jr.

[57] ABSTRACT

A combination weighing device for individually weighing a plurality of articles and selecting individual articles having a predetermined combined weight which includes an intended weight register, a plurality of weighing balances, an arithmetic unit for calculating the sum of the weights of selected articles and calculating the difference between the sum and the intended weight, a combination generator including switches for feeding predetermined combinations of article weights to said arithmetic unit, a comparator for determining the deviation of a combined weight with the intended weight for each combination of articles and a memory for recording the various computations so that the combination of article weights within prescribed limits and most nearly equal to the intended weight can be selected.

2 Claims, 1 Drawing Figure

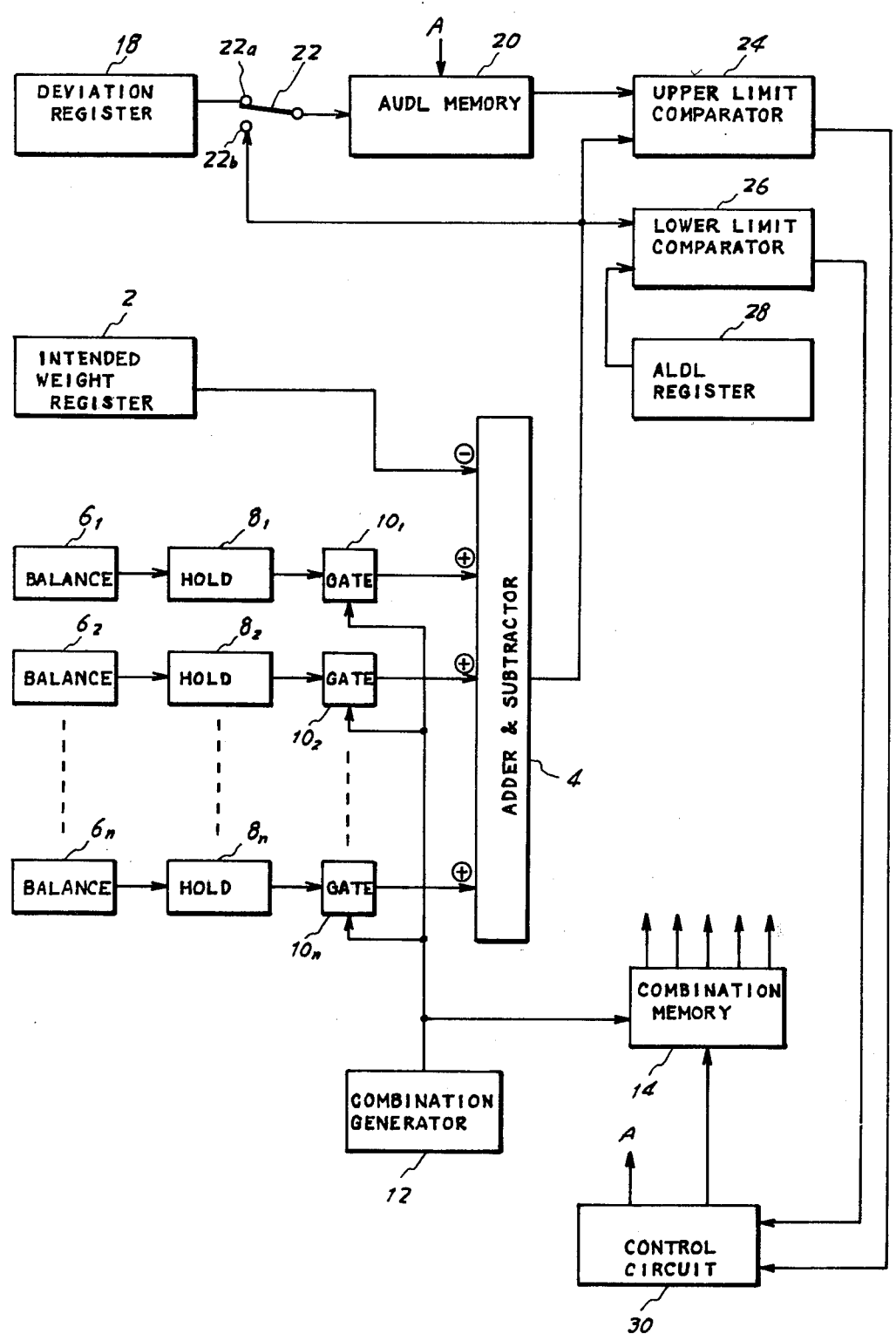

COMBINATION WEIGHING DEVICE

This invention relates to a combination weighing device, particularly to a device for use in instances wherein a plurality of articles are packed together with each pack having nearly constant weight The weighing device which is generally referred to as a "combination balance" or "combination weighing device" is used for extracting and collecting a plurality of articles from a group of articles, such as cakes, fishes and vegetables, having relatively large variances in respective weight, so that the extracted group has a weight which is nearly equal to a predetermined intended weight. A typical example of such a device is disclosed in Japanese patent application No. 54-14946 and corresponding U.S. Pat. No. 3,939,928. In that device, a plurality of articles are weighed individually by the same number of weighing balances at the same time, all mathematical combinations of the respective weights are summed respectively and the respective sums are subtracted from the intended weight to obtain corresponding deviations. Thus, the combination providing the least deviation is selected. However, that device is so complicated in the arithmetic circuit configuration that its manufacturing cost is substantially high. Moreover, it is impossible in that device to preset an allowable deviation so as to enable rejection of insufficient and excessive weights.

Therefore, an object of this invention is to provide a combination weighing device which is simple in circuit configuration and, therefore, low in manufacturing cost, and, moreover, which can be used to reject "off-limit" weights.

According to this invention, a combination weighing device comprises an intended weight register for storing an intended weight, a plurality of weighing balances for weighing respectively a plurality of articles to produce weight signals respectively, and normally-open switches for coupling the weight signals respectively to a common arithmetic unit which serves to sum up the applied weight signals and calculate a difference between this sum and the stored intended weight. A switch control unit is provided for closing some of the switches selected in accordance with a plurality of predetermined combinations. The device further comprises a memory for storing an allowable deviation from the intended weight, a comparator for producing an output when the difference produced from the arithmetic unit is within the allowable deviation, a control unit for updating the content of the memory with the difference produced by the arithmetic unit in response to the output of the comparator, and an output memory for storing the output of the switch control unit in response to the output of the comparator.

The device in accordance with this invention will be described in more detail with reference to the accompanying drawing which represents in block form an embodiment of the inventive device.

IN THE DRAWING

An intended weight register 2 is provided for manually presetting an intended weight. The output of the register 2 is coupled to a minus input of an adder and subtractor 4.

A plurality of weighing balances $6_1, 6_2, \ldots 6_n$ are provided for weighing a plurality of articles respectively, and producing corresponding weight signals in digital form. These weight signals are coupled through respective holding circuits $8_1, 8_2, \ldots 8_n$ and normally-closed gates (or normally-open switches) $10_1, 10_2, \ldots 10_n$ to plus inputs of the adder and subtractor 4. Each holding circuit is one which is wellknown in this field for use to fix the weight signal from each balance regardless of vibration of the balance. The adder and subtractor executes an arithmetic operation of summing up all the weight signals at its plus inputs and then subtracting therefrom the weight signal at its minus input, thereby producing a deviation signal.

A combination generator 12 has a set of outputs coupled respectively to the control inputs of the gates $10_1, 10_2, \ldots 10_n$. Although the combination generator 12 is shown having a single output for the purpose of simplification, it is to be noted that there are n-number of outputs for individually controlling the gates $10_1$ through $10_n$. The combination generator 12 is a device for producing successively all mathematical combinations of the outputs, the number of which should be $2^n - 1$ in total if the number of outputs is n, to open the gates in accordance with these combinations. Although various circuit configurations can be considered by those skilled in the art for the combination generator 12, an example which is relatively simple is an n-bit binary counter driven with a suitable clock generator (not shown). When the parallel outputs derived from the respective bits of the counter are coupled to the control inputs of the respective gates and the gates are arranged to be opened in response to binary "1" inputs, for example, the gates will encounter all of the combinations of actuation while the counter counts from zero until all bits become "1". The outputs of the combination generator 12 are also applied successively to a combination memory 14 which is arranged to update its content in response to the output of a control circuit 30.

The device is further provided with a deviation register 18 for presetting an allowable upper deviation from the intended weight, having an output coupled through a fixed contact 22a of a single-pole double-throw switch 22 to an allowable upper deviation limit (AUDL) memory 20 which is arranged to update its content in response to the output of the control circuit 30. The output of the memory 20 is applied to one input of an upper limit comparator 24, the other input of which is coupled to the output of the adder and subtractor 4.

The output of the adder and subtractor 4 is also coupled to another fixed contact 22b of the switch 22 as well as to one input of a lower limit comparator 26, the other input of which is coupled to the output of an allowable lower deviation limit (ALDL) register 28 for presetting an allowable lower deviation from the intended weight. The comparator 26 is arranged to compare algebraically, that is, taking signs into consideration, the content of the ALDL register 28 with the deviation signal from the adder and subtractor 4 and to produce an output when the former is less than the latter, while the comparator 24 is arranged to compare the content of the AUDL memory 20 with the deviation signal to produce an output when the former is greater than the latter. The outputs of both comparators 24 and 26 are coupled to the control circuit 30 which is arranged to produce a control signal for updating the contents of the combination memory 14 and the AUDL memory 20 when both outputs of comparators 24 and 26 are applied at the same time.

In operation, the predetermined intended weight of each group of articles, 500 grams for example, is registered in the intended weight register 2 and the allowable upper deviation, +10 grams for example, and the allowable lower deviation, −10 grams for example, are registered in the deviation register 18 and the ALDL register 28, respectively. The content of the deviation register 18 is transferred through the switch 22 to the AUDL Memory 20 and stored therein. The, the articles to be packed are respectively put on the cradles of the balances $6_1$ through $6_n$. The number of articles on each balance may be either single or plural as occasion demands. The generation of the combinations is then initiated by actuating the combination generator and at the same time switch 22 is moved to contact 22b by means not shown in the drawing.

When the combination generator 12 includes a binary counter, it will first generate a binary code ". . . 0001" of decimal "1" and open only the gate $10_1$ to transfer the weight signal of the balance $6_1$, 103 grams for example, to the adder and subtractor 4. The adder and subtractor 4 subtacts the content of the intended weight register 2, that is 500 grams, from 103 grams to produce a deviation signal representing -397 grams. The upper limit comparator 24 compares the content of the AUDL memory 20, that is +10 grams, with this −397 grams and produces an output since the former is greater than the latter. At the same time, the lower limit comparator 26 compares the content of the ALDL register 28, that is −10 grams, with −397 grams and produces no output since the former is not less than the latter. Therefore, no output is produced from the control circuit 30 and the content of the memory 20 is left as it is. The combination memory 14 is not actuated and does not store the combination.

In the next step, the combination generator 12 produces a binary code ". . . 0010" of decimal "2" and opens only the gate $10_2$ to transfer the weight signal of the balance $6_2$, 120 grams for example, to the adder and subtractor 4 which in turn executes calculation, 120−500=−380 grams. The same process as the above takes place and the contents of the memories are unchanged.

In the third step, the combination generator 12 produces a binary code ". . . 0011" of decimal "3" and opens the gates $10_1$ and $10_2$. In this case, the adder and subtractor 4 will execute calculation, 103+120−500 =−277 grams. The remainder of the process is executed as same as the above.

Assuming now the adder and subtractor 4 produced a deviation signal representing +7 grams for example, it would be understood that both the upper and lower limit comparators 24 and 26 can produce outptus and, therefore, the control circuit 30 produces a control signal. The control signal actuates the combination memory 14 to cause it to store the corresponding binary code from the combination generator 12 and, also, actuates the AUDL memory 20 to update its content from +10 grams to +7 grams.

Similar processes are executed for all combinations of the gates $10_1$ through $10_n$, or the balances $6_1$ through $6_n$ and, during the execution, the contents of both the memories 14 and 20 are updated each time when the value of the deviation signal from the adder and subtractor 4 comes in the range between the content of the ALDL memory 28 and the updated content of the AUDL memory 20. Accordingly, after all combinations have been generated, the combination memory 14 stores a combination corresponding to a combined weight having the minimum upper deviation and a lower deviation within the allowable limit.

While not shown in the drawing, means may be provided for deriving the content of the combination memory 14 upon completion of the process and utilizing it to collect automatically the articles on the corresonding balances into a package.

It should be noted that the above description is for illustrative purpose only and various modifications and changes may be made by those skilled in the art without departing from the scope of this invention as defined in the appended claims. Although only the AUDL memory 20 is arranged updatable with the control signal from the control circuit 30 in the embodiment, the ALDL register 28 can be arranged to also be updated so as to successively reduce the lower deviation. It is possible to provide means for confining the number of actuated gates and, therefore, the number of articles in each group to or within a specific number, and it is of course possible to remove some of the gates or make them always open so as to make the number of articles above a specific one.

The number of balances included in each device may be selected adequately taking into consideration its use and the allowable deviation. An example of this selection is described in the aforementioned Japanese Patent Publication No. 54-14946.

As described above, the device of this invention can execute more functions than the cited prior device regardless of its simpler circuit consisting of a combination of simple known logic units.

What is claimed is:

1. A combination weighing device comprising an intended weight register for storing a predetermined intended value of weight, a plurality of weighing balances for weighing a plurality of articles to be weighed, respectively, and producing weight outputs representative of the respective measured weights, an arithmetic unit for receiving said weight outputs and the content of said intended weight register to produce a deviation output representative of the difference between the sum of said measured weights and said intended weight, a plurality of normally-open switches inserted respectively between said weighing balances and said arithmetic unit, each of said switches having a control input, switch control means coupled to said control inputs of said swithces for selectively closing said switches in accordance with a plurality of predetermined combinations, a deviation memory for storing an allowable deviation with reference to said intended weight, a comparator for comparing said deviation output from said arithmetic unit with the content of said deviation memory and producing an output when said deviation output is within said allowable deviation, means for updating the content of said deviation memory with the deviation output of said arithmetic unit in response to the output of said comparator, and means for storing the output of said switch control means at the time when said comparator produces said output.

2. A combination weighing device according to claim 1, wherein said switch control means comprises a binary counter having bit outputs coupled to the control inputs of said switches, respectively, and a clock pulse generator coupled to the input of said counter.

* * * * *